Patented Oct. 2, 1923.

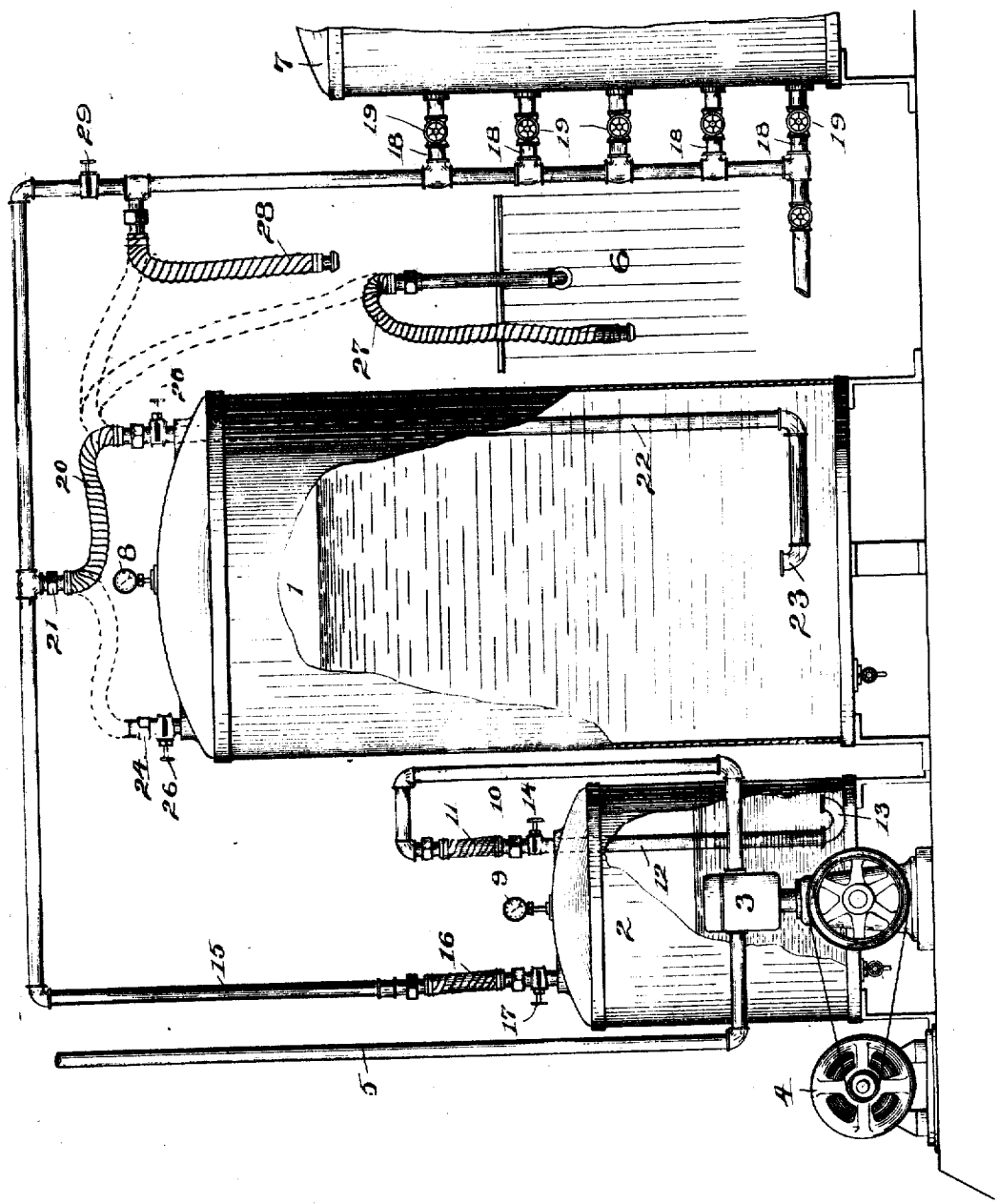

1,469,581

UNITED STATES PATENT OFFICE.

BENJAMIN BRAZELLE, OF LOS ANGELES, CALIFORNIA, ASSIGNOR TO AQUAZONE LABORATORIES, INC., OF LOS ANGELES, CALIFORNIA, A CORPORATION OF CALIFORNIA.

METHOD OF SUPERSATURATING LIQUIDS.

Application filed May 20, 1920. Serial No. 383,025.

*To all whom it may concern:*

Be it known that I, BENJAMIN BRAZELLE, a citizen of the United States, residing at Los Angeles, in the county of Los Angeles and State of California, have invented certain new and useful Improvements in Methods of Supersaturating Liquids, of which the following is a specification.

This invention relates to a process of dissolving gases in liquids and more particularly to a process of supersaturating liquids with oxygen gas, and to the product resulting therefrom.

This invention has for its object the provision of an improved sequence of steps for producing a solution of a desired gas, in an efficient and economical manner.

Another object of this invention is to effect the dissolving of a gas, particularly oxygen, out of a mixture of gases, such as the atmosphere, in water.

Still another object is to produce an improved solution containing oxygen to a degree which imparts to it valuable chemical and therapeutic properties.

Other objects of this invention will in part be hereinafter specifically pointed out and in part obvious from the arrangements and constructions here set forth.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

For a fuller understanding of the nature and objects of the invention reference should be had to the following detailed description taken in connection with the accompanying drawing in which:

The figure shown illustrates an arrangement of apparatus adapted for the practice of this invention.

Referring now to the drawing, 1 designates a tank or container which is substantially filled with a body of water or other liquid which is to be treated to produce the desired solution. Adjacent the tank 1 there is a second tank 2 which contains a washing liquid, preferably water, through which the body of gas to be admitted to tank 1, is forced by the compressor 3. The compressor 3 is preferably power driven as indicated by the electric motor 4. The gas pumped by the compressor comes to it through the inlet pipe 5 leading from any convenient source, as the atmosphere.

The outlet pipe 10 of the compressor leads to the tank 2, a flexible connection 11 effecting the conjunction between the pipe 10 and the pipe 12 which extends down towards the bottom of the tank 2 and has an upturned nozzle 13 whereby it discharges upwardly into the tank 2. The pipe 12 is provided with a controlling valve as indicated at 14.

A water supply pipe 15 leading from any convenient source of water supply, as, for instance, the purification plant shown at 7 in the drawing, communicates with both tanks 1 and 2. The depending left hand branch of the pipe 15 has a flexible connection 16 leading to the top of the tank 2 controlled by the valve 17. A flexible connection, indicated at 20, also leads from the coupling 21 in the pipe 15, and is adapted to connect with the upper end of the pipe 22 which extends into and reaches close to the bottom in the tank 1. The pipe 22 is also provided with an upturned nozzle 23 at its lower end. The pipe 22 is controlled by a valve 25. The tank 1 moreover has a connection 24 entering at the top and controlled by the valve 26. The flexible connection 20 when desired may be disconnected from the pipe 22 and connected to the connection 24 in order to apply pressure to the surface of the liquid within the tank 1.

The pipe 15 has a valve 29 adapted normally to cut off communication between the tanks 1 and 2 and the filtration plant 7, in order that pipe 15 may serve as a conduit for the passage of washed air from tank 2 into tank 1. Between the valve 29 and the filtration plant there is provided a second flexible connection 28 which may be coupled to the pipe 22, when the flexible connection 20 is disconnected, for the purpose of filling the tank 1 with water. Valves 19 are provided, which control the connections 18 between the filtration plant 7 and the pipe 15.

In the practice of this invention, the tank 1 is preferably filled with water which has been given a preliminary treatment by passing it through the filtration plant to free it of deleterious matter; the tank being filled to within approximately 15% of its capacity, the level being indicated in the drawings. The tank 2 having been properly filled with washing water and the pipe connections to the tanks 1 and 2 having been made as indicated in full lines in the drawing, the apparatus is ready to have the compressor 3 started for pumping air through the water in tank 1. Gauges at 8 and 9 on the tanks 1 and 2 respectively show when proper pressures have been attained. Air is pumped into the tank 1 until the gauge 8 indicates approximately 115 lbs. at which time the valve 26 on the top of the tank 1 is alternately opened and closed until the pressure has been reduced approximately to 100 lbs. The compressor 3 is operated continuously throughout the period for which the water in the tank 1 is treated to produce the desired solution. During the period of treatment the valve 26 is opened sufficiently to maintain a head of pressure at substantially 100 lbs. in the tank 1, the air being passed through continuously. The duration of the treating period is approximately thirty minutes. In this manner an elastic pressure of several atmospheres, preferably in excess of four atmospheres, is maintained above the body of water being treated which produces a pressure condition favorable to the production of super-saturated solutions of oxygen gas, the gas having been selectively dissolved from the body of atmospheric air passed through the water in tank 1. The temperature of the water being treated is preferably below 60° F., the optimum temperature is somewhat below this. By maintaining the conditions, which as above stated are conducive to the absorption of gas, for the proper period, supersaturated solutions of oxygen in water containing in excess of thirty-five cubic centimeters per liter of water may be obtained. This is approximately five and one-half times the normal oxygen content found in solution in water.

When the period of treatment is over the valve 26 is suddenly opened so as quickly to reduce the pressure within the tank substantially to about 80 lbs. By this process the solution produced in the tank is brought into a condition of stable equilibrium by permitting the volatile gas held in solution to bubble off. The solution resulting is quite stable and holds its oxygen in a very retentive manner for long periods of time lasting frequently for many hours under normal atmospheric conditions.

The solution under reduced pressure is now ready to be drawn off. This is conveniently effected by disconnecting the flexible connection 20 from pipe 22 and connecting it to the coupling 24. A flexible connection 27, leading to a suitable bottling machine 6, is then connected to the pipe 22. Both valves 25 and 26 are afterwards opened and the compressor 3 arranged to maintain in the tank 1 the pressure of 80 lbs. The contents of the tank in this manner may be bottled or otherwise preserved in suitable vessels for commercial, industrial and therapeutic purposes. By varying the conditions of pressure and temperature, the volume of liquid being treated, etc., the conditions for producing solutions of selectively absorbed gases in amounts other than those herein stated by way of example may be produced.

Since certain changes in carrying out the above process and certain modifications in the product which embody this invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The process of producing supersaturated solutions of oxygen gas in water which comprises maintaining a body of water to be treated under a substantially constant pressure in excess of four times atmospheric at a determined optimum temperature, and forcing a volume of atmospheric air through said body of water continuously while subject to said pressure for a sufficient time to secure substantially maximum oxygen absorption, the undissolved atmospheric constituents being permitted to escape.

2. The process of producing supersaturated solutions of oxygen gas in water which comprises maintaining a body of water to be treated under a substantially constant pressure in excess of four times atmospheric at a determined optimum temperature, forcing a volume of atmospheric air through said body of water while subject to said pressure for a sufficient time to secure substantially maximum oxygen absorption, reducing the pressure at the end of the treating period by substantially a fifth of that maintained during treatment, and withdrawing and sealing the solution in vessels while subject to reduced pressure.

3. The steps in a process of making supersaturated solutions of oxygen adapted to be sealed in containers in suitable condition, which comprises producing a solution containing substantially a maximum volume of absorbed oxygen, reducing the pressure at the end of the treating period by substantially a fifth of the treating pressure, and withdrawing and sealing in containers said solution while at reduced pressure.

4. The process of producing solutions of oxygen gas in water which comprises passing a continuously traveling body of gas containing oxygen through water while subject to pressure in excess of substantially four atmospheres, agitating the same in a manner to secure molecular contact between the oxygen and water whereby absorption results, and permitting the escape of the unabsorbed components.

5. The process of producing supersaturated solutions of oxygen gas in water, which comprises freeing a body of water from deleterious matter, maintaining said body subject to a substantially constant gas pressure in excess of four atmospheres and a determined optimum temperature, and forcing a volume of atmospheric air through said body continuously while subject to said pressure for a sufficient time to secure substantially maximum oxygen absorption, the undissolved atmospheric constituents being permitted to escape.

6. The steps in a process of making supersaturated solutions of oxygen gas in water which comprises freeing a body of water of deleterious matter, dissolving therein substantially a maximum volume of absorbed oxygen, reducing the pressure at the end of the absorption period by substantially a fifth of the pressure obtaining while absorbing oxygen, and withdrawing and bottling said solutions while at reduced pressure.

7. As a new product, a solution of oxygen in water, free of deleterious matter and rendered stable, in which the oxygen is held retentively under normal atmospheric conditions in absorbed condition in amounts in excess of 35 cubic centimeters per liter.

8. As a new product, a supersaturated solution of oxygen gas in water, which has been freed of deleterious matter, and has been rendered stable by treatment with pressures less by a fifth than the dissolving pressure, the dissolved oxygen being held retentively under normal atmospheric conditions.

9. As a new product, a supersaturated solution of oxygen which has been rendered stable and free from deleterious matter, the oxygen having been dissolved under pressure in excess of four atmospheres and retentively held to an extent substantially in excess of 35 cubic centimeters per liter.

In testimony whereof I affix my signature.

BENJAMIN BRAZELLE.